Oct. 11, 1955 H. O. GRIMMEISEN 2,720,359
REGISTERING MECHANISM

Filed June 22, 1953 5 Sheets—Sheet 1

INVENTOR.
Herman O. Grimmeisen,
BY Chapin & Neal.
Attorneys.

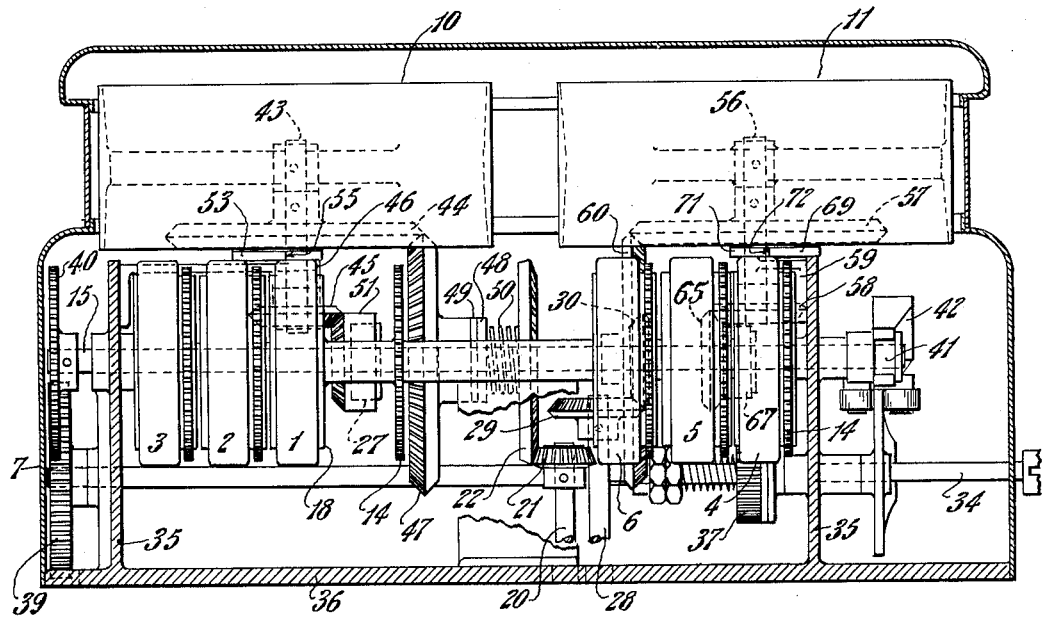
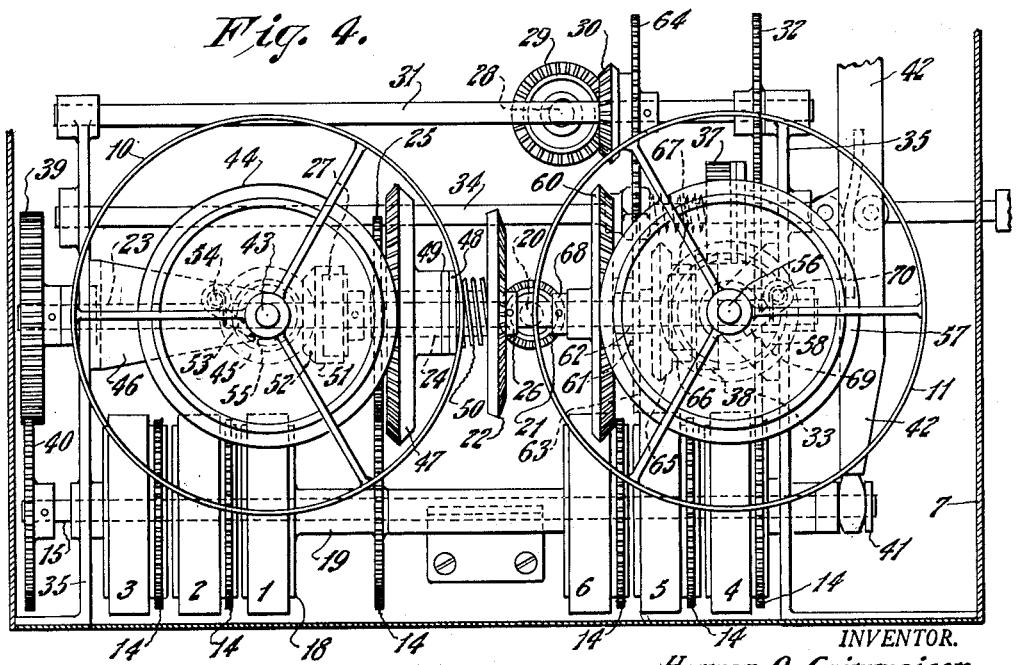

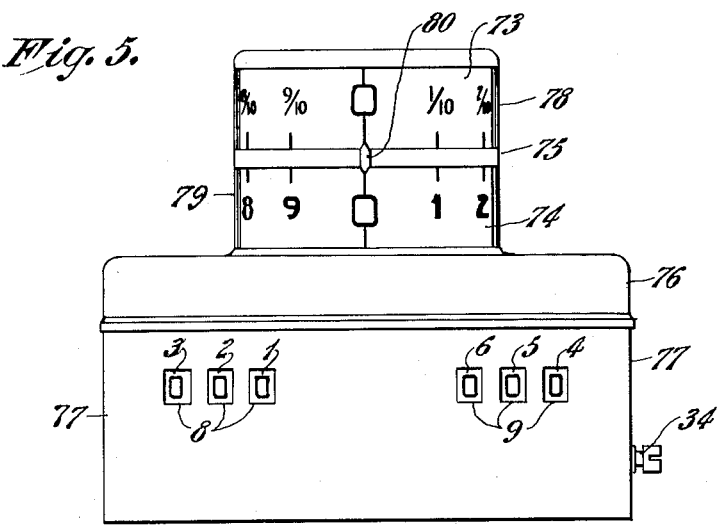
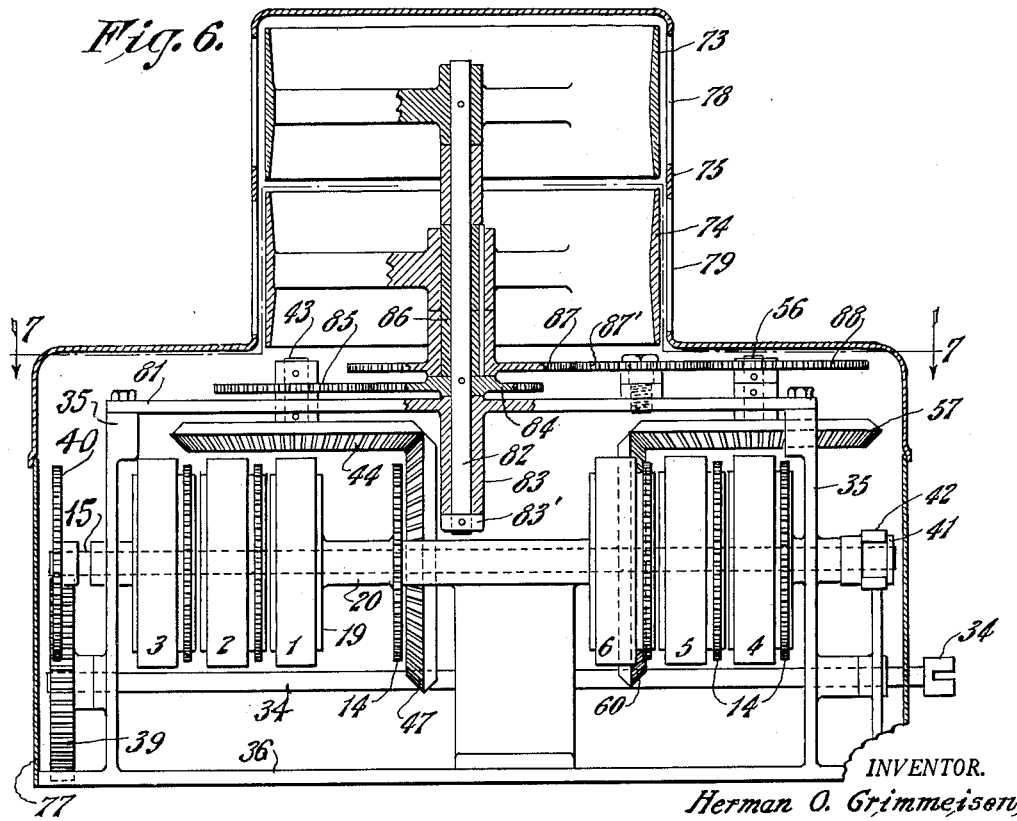

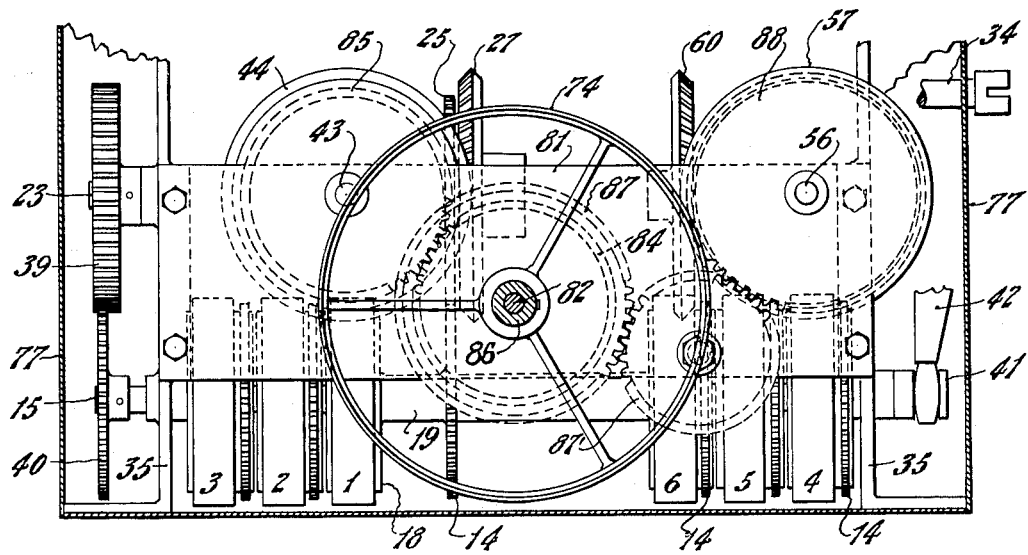

Oct. 11, 1955
H. O. GRIMMEISEN
2,720,359
REGISTERING MECHANISM
Filed June 22, 1953
5 Sheets-Sheet 5
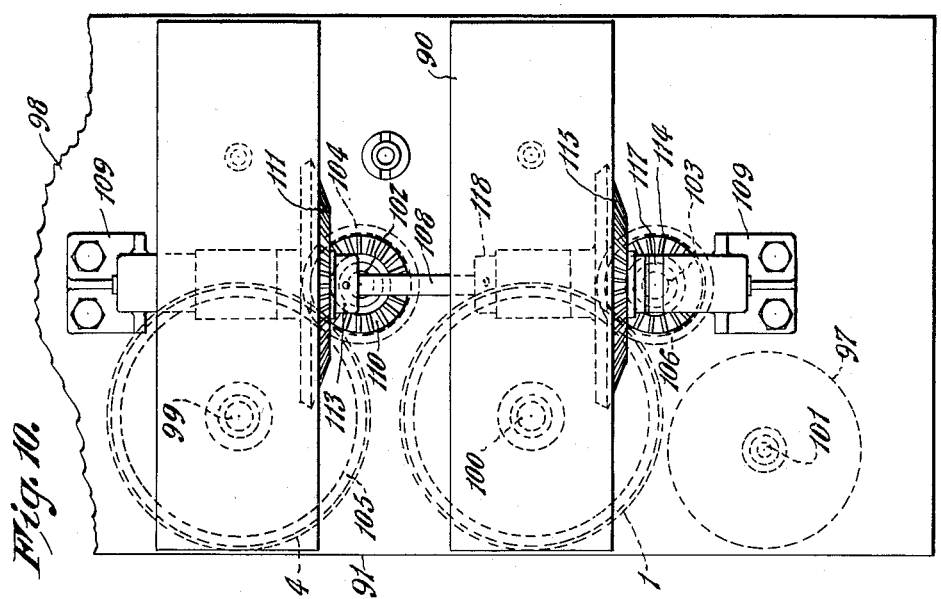
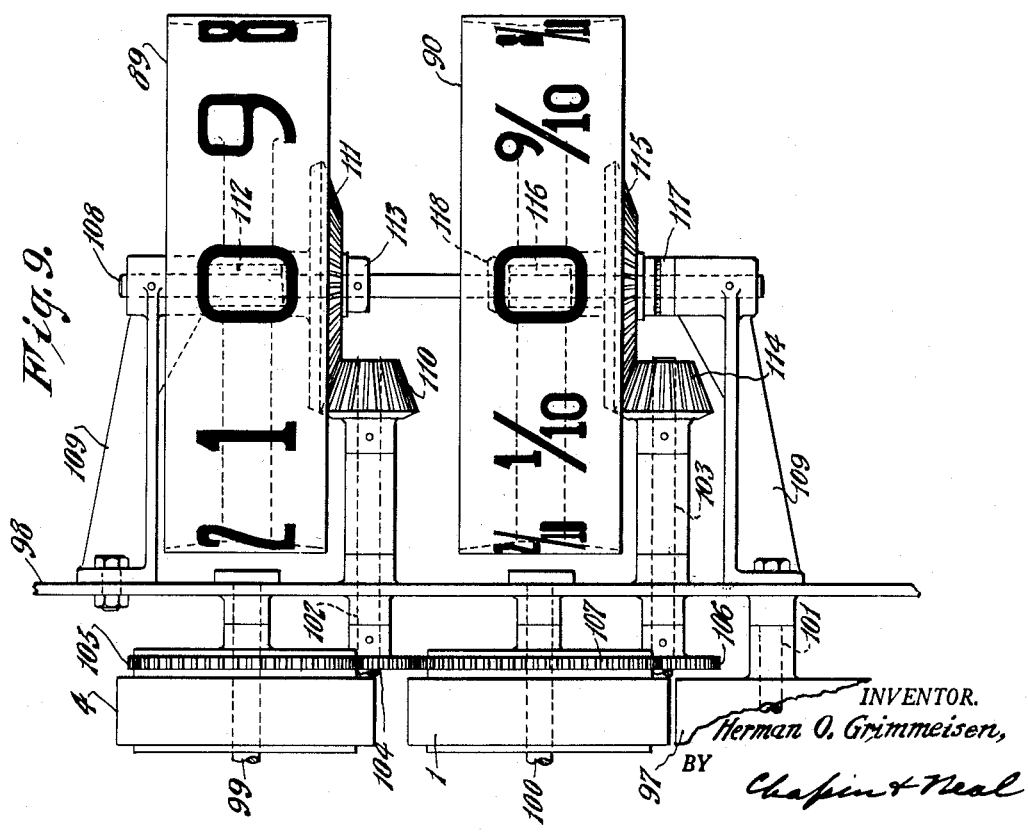
INVENTOR.
Herman O. Grimmeisen,
BY
Chapin & Neal
Attorneys.

United States Patent Office 2,720,359
Patented Oct. 11, 1955

2,720,359

REGISTERING MECHANISM

Herman O. Grimmeisen, West Springfield, Mass., assignor to Gilbert & Barker Manufacturing Company, Springfield, Mass., a corporation of Massachusetts Application June 22, 1953, Serial No. 363,176

1 Claim. (Cl. 235—1)

This invention relates to improvements in registers and, more particularly, to those registers which are adapted to indicate to a customer the quantity and/or cost of the material dispensed in a single transaction.

While the invention is capable of general application, it has been especially developed for, and finds one advantageous use in, apparatus of the kind that is used at automotive service stations for dispensing measured amounts of gasoline and the like.

The invention has for its general object the provision in a register of the class described of a lowest order number wheel that is calibrated and made much larger than the other number wheels of higher order for the purpose of affording better visibility and closer accuracy of measurement.

The invention has for other objects the relating of one or more such lowest-order, large-diameter, number wheels with the other small-diameter number wheels of the same series in various novel ways.

The improvements of this invention, for example, make it easier for an operator of a gasoline dispensing pump by watching the calibrations on the large-diameter, lowest-order, number wheel to stop delivery with closer accuracy at the desired point, as for example, at zero on the tenths of gallon number wheel or at some selected cent on the cents number wheel, several of the calibrations and their associated numbers being visible so that the operator can watch the selected calibration approach the fixed pointer on the register.

The invention will be disclosed with reference to the accompanying drawings, in which—

Fig. 3 is a sectional elevational view, drawn to a larger scale, and showing the interior mechanism of the register;

Fig. 4 is a sectional plan view of the register;

Fig. 5 is a small-scale exterior elevational view of a second form of register embodying the invention;

Fig. 6 is a sectional elevational view of the register shown in Fig. 5;

Fig. 7 is a sectional plan view taken on the line 7—7 of Fig. 6;

Fig. 8 is a small-scale exterior-elevational view of a third form of register embodying the invention;

Fig. 9 is a fragmentary sectional elevational view of the register of Fig. 8; and Fig. 10 is a cross sectional view taken on the line 10—10 of Fig. 8.

Figure 1:
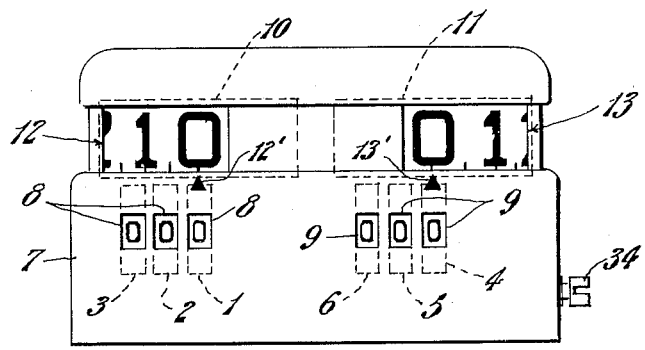
Fig. 1 is a small-scale exterior-elevational view of one form of register embodying the invention.
Figure 2:
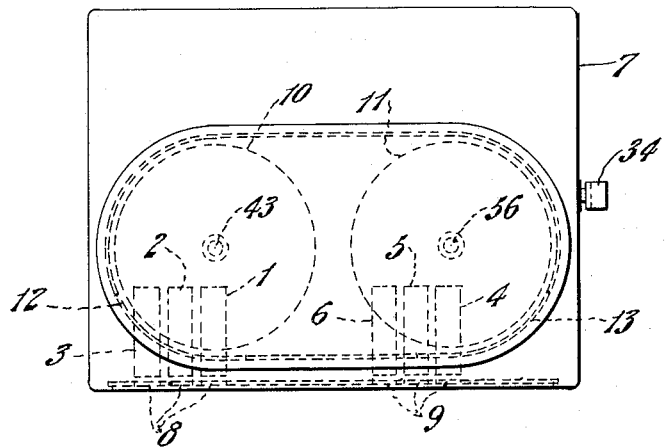
Fig. 2 is a top plan view of the register.

Referring to these drawings and first to Figs. 1 to 4 thereof, the first form of the invention has been shown as adapted to be embodied in a registering mechanism of the type disclosed in Bliss Patent No. 2,568,709, dated September 25, 1951. Such register includes two series of small number wheels mounted side by side at the same level and respectively indicating quantity and cost of the material dispensed. The first series includes three number wheels, 1, 2 and 3, which are of successively higher order and in this case show respectively tenths, units and tens of gallons. The second series includes three number wheels 4, 5 and 6, which are of successively higher order and in this case respectively show cost in cents, tens and dollars. All these wheels are rotatably mounted within a casing 7 having sets of windows 8 and 9 through which the indications of the quantity and cost wheels are respectively visible.

This invention provides an additional low order number wheel for each said series and these additional wheels are much larger in diameter so that their indications may be read with greater ease and accuracy. Thus, a number wheel 10, showing tenths of gallons, is mounted above the number wheels 1, 2 and 3 for rotation about a vertical axis and a similar number wheel 11, showing cents, is similarly mounted above the number wheels 4, 5 and 6. The casing 7 has windows 12 and 13 through which the indications of wheels 10 and 11 are respectively visible. The indications of the wheels 10 and 11 are read with reference to pointers 12' and 13', respectively, which are in line vertically with the windows 8 and 9 for the low order wheels 1 and 4, respectively.

The small-diameter number wheels 1, 2, 3, 4, 5 and 6 are actuated in the same manner, both as to counting and resetting, as disclosed in said patent. Each number wheel (Figs. 3 and 4) is connected to a driving gear 14 by means of a clutch which is releasable by axial movement (to the right as viewed in these figures) of the shaft 15 on which all these wheels are mounted. Each number wheel when clutched to its gear 14 is free to rotate on shaft 15. When, however, the wheels are declutched from their gears 14, all are then frictionally engaged with shaft 15 so that the latter may be turned to carry all the wheels back to zero position, each wheel being arrested at such position by suitable zero stops as disclosed in said patent.

Each number wheel of lowest order, such as 1 and 4, is driven by suitable gearing to be described. The other number wheels of each set are driven one from another by suitable transfer mechanism, as disclosed in said patent. The two sets of wheels are constructed and operate exactly as disclosed in said patent and the only differences here are that (1) the axial spacing between the two sets has been increased in order to make room for the mechanism which drives the large diameter number wheels 10 and 11 and (2) the driving gear 14 for number wheel 1 is spaced from the clutch plate 18 thereof by a sleeve 19, rigidly connecting the gear and plate instead of being combined in one unit as in the patent and in the other number wheels herein shown.

The drive for the number wheel 1 is derived from a vertical "gallons" shaft 20 having a bevel gear 21, meshing with a bevel gear 22 which is mounted to turn freely on a shaft 23 and which has a long hub 24, having fixed thereto a spur gear 25 that meshes with the gear 14 of the number wheel 1. The combined unit, the gears 22, 25 and hub 24, is held in position axially on shaft 23 by a collar 26, which engages one face of gear 22, and the driving element 27 of a one-way clutch, such element being fixed to shaft 23.

The drive for the number wheel 4 is derived from a vertical shaft 28 which, in practice, is driven from shaft 20 by means of the usual and well known variator or variable-speed mechanism (not shown). This shaft 28 has fixed thereto a bevel gear 29, meshing with a bevel gear 30 fixed to a shaft 31. The latter has fixed thereto a spur gear 32, which meshes with a gear 33, mounted to turn freely on a shaft 23 and meshing with the gear 14 of number wheel 4.

The supporting shaft 15 for all the number wheels 1, 2, 3, 4, 5 and 6 is rotated from a resetting shaft 34.

This shaft as well as the shafts 15, 23 and 31 are suitably supported near their ends in two spaced side frames 35, which are fixed to and upstand from a suitable base 36. The resetting shaft 34, which is at a lower level than shafts 15, 23 and 31, is connected by spur gears 37 and 38 to turn shaft 23 and the latter has fixed thereto a gear 39 which meshes with a gear 40 fixed on one end of shaft 15. The described gear 33 is held from axial displacement on shaft 23 between spur gear 38 and the right hand side frame 35. The shaft 15 has thereon a clutch collar 41 engaged by a shifter bar 42, which is actuated by the mechanism disclosed in said patent.

The large diameter low-order quantity wheel 10 is fixed to the upper end of a short vertical shaft 43, to which is also fixed in axially-spaced relation large and small bevel gears 44 and 45 respectively. The shaft 43 is rotatably supported in the hub of a bracket 46, which is fixed to the adjacent side frame 35, such hub being located and filling the space between the adjacent end faces of the gears 44 and 45. The large bevel gear 44 is driven by a bevel gear 47 of the same diameter. Gear 47 is mounted to turn freely on the described long hub 24 of gear 22 and is driven therefrom by a suitable friction clutch, herein indicated as a disk 48 slidable on hub 24 and pressed against a facing 49 on the hub of gear 47 by means of a spring 50, coiled around shaft 23 and acting between gear 22 and disk 48. It will thus be seen that wheel 10 will be driven at the same speed as wheel 1. The small number wheels 1, 2 and 3, are so moved when counting, that the figures on the wheels progress upwardly past their windows 8 and the large wheel 10 is so driven when counting that the figures thereon progress to the right past window 12 (see Fig. 1). Resetting is accomplished by reverse rotation of the wheels. The clutch element 27, which as heretofore described is fixed to the secondary resetting shaft 23, drives clutch element 51 formed in the hub of a small bevel gear 52, which meshes with the small bevel gear 45 of the same size on shaft 43 of wheel 10. The clutch 27—51 is a one-way clutch of any suitable well known form that drives shaft 10 in the direction necessary to reset it but allows the element 51 to turn relative to the stationary element 27 and shaft 23, while shaft 10 is being driven in a counting direction by gear 22. The clutch 48—49 allows the large wheel 10 to be turned backwardly for resetting while the driving gear 22 is held stationary.

For arresting the number wheel 10 at zero position, when turned backwardly as described, any suitable zero stop may be provided, such for example as a spring-pressed pawl 53 pivoted at one end to the upper face of bracket 46 at 54 and having its other end riding on the periphery of the hub of bevel gear 44, such hub having a single notch therein with a radial shoulder 55 engaged by the pawl when wheel 10 is in zero position. The pawl permits movement of wheel 10 in a counting direction (counterclockwise as viewed in Fig. 4) but will stop the wheel when on clockwise movement it arrives in zero position.

The large number wheel 11 is fixed to a vertical shaft 56 to which are also fixed in axially-spaced relation large and small bevel gears 57 and 58 respectively. Shaft 56 is rotatably supported in a bearing 59 provided on the adjacent side frame 35 and located and filling the space between the large and small bevel gears 57 and 58. The large gear 57 meshes with a similar gear 60 of the same size which is free to turn on shaft 23 and which has fixed thereto a clutch element 61. Engaged with the latter is a clutch element 62 fixed to a spur gear 63 also loose on shaft 23 and driven by a spur gear 64 fixed to the bevel gear 30 on cost shaft 31. The small bevel gear 58 meshes with a similar gear 65 of equal size which is free to turn on shaft 23 and which has fixed thereto a clutch element 66. Engaged with the latter is a clutch element 67, which is fixed to the described gear 38. The large bevel gear 60, clutch elements 61 and 62 and spur gear 63 and the small bevel gear 65 are held against axial displacement on shaft 23 between the clutch element 67 on gear 38, which is fixed to shaft 23 and a collar 68 also fixed to shaft 23 and engaging gear 60. The clutch 66—67 allows the number wheel 11 to be driven in a counting direction (clockwise as viewed in Fig. 4) while shaft 23 is held stationary and drives shaft 11 in a resetting direction when the cost shaft 22 is held stationary. The clutch 61—62 drives wheel 11 in a counting direction and enables it to be turned in the direction necessary to reset it while the cost shaft 22 is stationary.

For arresting the number wheel 11 at zero position, when turned backwardly (counterclockwise as viewed in Fig. 4) as described, a spring-pressed pawl 69 is pivoted at one end to frame 35 at 70 and has its other end riding on the periphery of the hub 71 of gear 57. Such hub has a notch with a radial shoulder 72 adapted to be engaged by the pawl when wheel 11 is in zero position.

A second form of the invention is shown in Figs. 5 to 7. Here the large-diameter, low-order quantity and cost wheels 73 and 74, respectively, are mounted one above another for rotation about a common vertical axis which is located in a vertical plane transverse to the axis of the small number wheels and mid way between the two sets of small number wheels. These wheels (Fig. 5) are contained within a cylindrical casing 75 upstanding from the cover 76 of a casing 77. This casing 75 has large windows 78 and 79 through which large portions of the peripheries of wheels 73 and 74 are respectively visible, and a marker 80 with reference to which the graduations on both wheels are read. The casing 77 houses small-diameter cost and quantity number wheels and actuating mechanism therefor, which wheels and mechanism are exactly the same as described in connection with the first form of the invention. The same means which was used with such first form for actuating wheels 10 and 11, is employed but these wheels are removed and the shafts 43 and 56 are geared, as will be described, to turn the wheels 73 and 74. A cross plate 81 is fixed at its ends to the tops of the side frames 35 as indicated and is provided with a bearing 83 for a vertical shaft 82 for supporting the number wheels 73 and 74. This shaft has fixed thereto a gear 84, which meshes with a gear 85 of equal size on shaft 43, and the upper or quantity number wheel 73, whereby the latter will be driven at the same speed as the lowest order wheel 1 but in a direction opposite to that in which wheel 10 was driven. The hub of gear 84 rests on the upper end face of the bearing 83 and a collar 83′, fixed to the lower end of shaft 82, engages the lower end face of bearing 83, whereby shaft 82 is held against axial displacement. Rotatably mounted on shaft 82 with its lower end supported on the hub of gear 84 is a sleeve 86, to which are fixed a gear 87 and the lowest-order wheel 74. Gear 87 is driven through an idler 87′, which is rotatably mounted on cross plate 81, from a gear 88, which is of the same size as gear 87 and is fixed on shaft 56, whereby the wheel 75 rotates in the same direction as wheel 74. It will be clear that the wheels 74 and 75 will be driven in synchronism with their respective low-order number wheels 1 and 4 during counting, both wheels 74 and 75 turning in the same direction (from right to left as viewed in Fig. 5). Also, that the same means used for resetting wheels 10 and 11 will reset wheels 74 and 75 in the same manner.

A third form of the invention is shown in Figs. 8, 9 and 10. In this form, the large-diameter cost and quantity wheels 89 and 90 are mounted one above the other for rotation about a common vertical axis, as in the second form, but each wheel is located opposite the set of corresponding small-diameter number wheels, as will be clear from Fig. 8. The axis of rotation of cost wheels 4, 5 and 6 lies in a horizontal plane passing centrally through wheel 89 and the axis of quantity wheels 1, 2 and 3 lies in a horizontal plane passing centrally through wheel 90. All the wheels are contained within a casing 91, which has windows 92 and 93 through which the indications of wheels 89 and 90 are visible; windows 94 and 95 through which the indications of the small-diameter cost and quantity wheels are respectively visible; and windows 96 through which are visible the indications of small number wheels 97 that display the unit price.

This form of the invention is adapted for application to a register of the type shown in U. S. Patent No. 2,390,239, granted December 4, 1945, on an invention of Warren H. De Lancey. Such register has sets of cost, quantity and price wheels, which are mounted one above the other for rotation about parallel horizontal axes and which can be located in back of the windows 94, 95 and 96 respectively. In Fig. 10, part of one of the side frames of the register has been shown and designated 98, and shafts marked 99, 100 and 101 on which the cost wheels 4, 5 and 6, the quantity wheels 1, 2 and 3 and the price wheels 97 are respectively mounted. Two shafts 102 and 103 have also been shown in frame 98 and these respectively actuate the cost and quantity wheels, moving them for counting when turned clockwise and for resetting when turned counterclockwise. The shaft 102 has a gear 104, which drives gear 105 on shaft 99. The shaft 103 has a gear 106, which drives a gear 107 on shaft 103. These shafts 102 and 103 are utilized herein to drive the large-diameter cost and quantity wheels 89 and 90, respectively. As shown in Fig. 9, a vertical shaft 108, which is fixed at its ends in upper and lower brackets 109, fixed to frame 98, lies in a vertical plane which includes the horizontal axes of shafts 102 and 103. A bevel gear 110 fixed to shaft 102 drives a bevel gear 111, fixed to a sleeve 112, which is rotatably mounted on shaft 108 and has fixed thereto the number wheel 89. The ratio of gears 110 and 111 is the same as that of the gears 104 and 105 so that wheel 89 will turn at the same speed as the low order number wheel 4. The hub of gear 111 is supported on top of a collar 113 fixed on shaft 108 and the hub of number wheel 89 is supported on top of the hub of gear 111. The hub of wheel 89 rests on top of gear 111 and is held against axial displacement by the upper bracket 109. The shaft 103 has fixed thereto a bevel gear 114, which drives a bevel gear 115, fixed to a sleeve 116 which is rotatably mounted on shaft 108 and which has fixed thereto the number wheel 90. The hub of gear 115 is supported by a thrust bearing 117 from the top of the lower bracket 109. The hub of wheel 90 rests on top of gear 115 and a collar 118, fixed to shaft 108, holds the sleeve 116 against axial displacement. The ratio of bevel gears 114 and 115 is the same as that of gears 106 and 107.

In all forms of the invention, a lowest-order number wheel is provided, which is much larger in diameter than the small number wheels of the series with which it is related. There has also been shown the usual lowest-order number wheel of small diameter but, if the indications of this wheel are not desired, they may be obscured by omitting the window through which they are visible. In general, the windows for the large-diameter lowest-order wheels are arranged so that several of the calibrations and numerals are visible at one time. This is to enable an operator to see a selected numeral or calibration in advance and watch its approach to the fixed pointer on the casing of the register. By so doing the operator can stop delivery with close accuracy, when the desired calibration or numeral aligns with the fixed pointer. Better visibility is provided and this helps the operator who is usually located at a distance from the register and also enables the customer more readily to check the accuracy of the delivery.

What is claimed is:

In a register, having a plurality of number wheels of relatively small diameter and of successively higher order mounted for rotation about a horizontal axis, a number wheel of much larger diameter mounted adjacent the small number wheels for rotation about a vertical axis located in a plane that passes transversely through the small number wheel of lowest order, means for driving the large number wheel synchronously with the small number wheel of lowest order, and a casing in which all said number wheels are mounted and which has separate windows through which the indications of the small and large number wheels are visible and which are spaced apart, and a common pointer for the small number wheel of lowest order and the large number wheel on the casing in the space between said windows.

References Cited in the file of this patent

UNITED STATES PATENTS

| | | |
|---|---|---|
| 1,196,898 | Sulfer | Sept. 5, 1916 |
| 1,299,786 | Schantz | Apr. 8, 1919 |
| 2,125,322 | Svenson | Aug. 2, 1938 |
| 2,337,844 | Tancred | Dec. 28, 1943 |